United States Patent
Jang

(10) Patent No.: US 10,213,778 B2
(45) Date of Patent: Feb. 26, 2019

(54) CATALYTIC CONVERTER AND METHOD OF CONTROLLING EXHAUST EMISSION

(71) Applicant: HYUNDAI MOTOR COMPANY, Seoul (KR)

(72) Inventor: Chun Soon Jang, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/370,132

(22) Filed: Dec. 6, 2016

(65) Prior Publication Data

US 2018/0112570 A1  Apr. 26, 2018

(30) Foreign Application Priority Data

Oct. 26, 2016  (KR) .................. 10-2016-0140402

(51) Int. Cl.
*F01N 3/00* (2006.01)
*B01J 35/00* (2006.01)
(Continued)

(52) U.S. Cl.
CPC ...... *B01J 35/0006* (2013.01); *B01D 53/9431* (2013.01); *B01D 53/9445* (2013.01); *B01D 53/9495* (2013.01); *B01J 23/40* (2013.01); *F01N 3/101* (2013.01); *F01N 3/105* (2013.01); *F01N 3/2006* (2013.01); *F01N 3/28* (2013.01); *F01N 3/2803* (2013.01); *F01N 13/0093* (2014.06); *F01N 13/0097* (2014.06); *B01D 2255/102* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *F01N 2340/02* (2013.01); *F01N 2430/06* (2013.01); *F01N 2450/00* (2013.01);
(Continued)

(58) Field of Classification Search
CPC . F01N 13/009; F01N 13/0093; F01N 13/0097
See application file for complete search history.

(56) References Cited

U.S. PATENT DOCUMENTS

| | | | |
|---|---|---|---|
| 5,996,339 A | 12/1999 | Gottberg et al. | |
| 9,833,831 B2 * | 12/2017 | Hijazi | .............. B21D 53/88 |
| 9,896,988 B2 * | 2/2018 | Lee | .................. F01N 9/00 |

FOREIGN PATENT DOCUMENTS

| | | |
|---|---|---|
| JP | 2001-227335 A | 8/2001 |
| JP | 3654651 B | 6/2005 |

(Continued)

*Primary Examiner* — Binh Q Tran
*Assistant Examiner* — Anthony Ayala Delgado
(74) *Attorney, Agent, or Firm* — McDonnell Boehnen Hulbert & Berghoff LLP

(57) ABSTRACT

The present disclosure relates to an improved catalytic converter capable of significantly reducing emissions by reducing the activation time of a catalytic device thereby improving emissions reduction performance, and an exhaust emission emissions reduction control method using the improved catalytic converter. The improved catalytic converter includes: a housing and two or more catalyst substrates disposed inside the housing, wherein the two or more catalyst substrates are separated inside the housing along a longitudinal direction, and the two or more catalyst substrates have a different diameter and a different volume.

7 Claims, 7 Drawing Sheets

(51) Int. Cl.
  *F01N 3/28*   (2006.01)
  *B01D 53/94*  (2006.01)
  *B01J 23/40*  (2006.01)
  *F01N 3/10*   (2006.01)
  *F01N 3/20*   (2006.01)
  *F01N 13/00*  (2010.01)
  *F02D 41/14*  (2006.01)
  *F02D 41/12*  (2006.01)
  *F02D 41/02*  (2006.01)

(52) U.S. Cl.
  CPC .. *F01N 2510/06* (2013.01); *F01N 2510/0682* (2013.01); *F01N 2560/025* (2013.01); *F01N 2900/1402* (2013.01); *F01N 2900/1624* (2013.01); *F02D 41/0295* (2013.01); *F02D 41/123* (2013.01); *F02D 41/126* (2013.01); *F02D 41/1454* (2013.01); *Y02T 10/22* (2013.01); *Y02T 10/26* (2013.01)

(56) References Cited

FOREIGN PATENT DOCUMENTS

| KR | 2003-0097226 A | 12/2003 |
| KR | 100774718 B1 | 11/2007 |
| KR | 102011-0116581 A | 10/2011 |

\* cited by examiner

CATALYTIC CONVERTER AND METHOD OF CONTROLLING EXHAUST EMISSION

CROSS-REFERENCE TO RELATED APPLICATION

This application claims the benefit of and priority to Korean Patent Application No. 10-2016-0140402, filed on Oct. 26, 2016 in the Korean Intellectual Property Office, the disclosure of which is incorporated herein in its entirety by reference.

BACKGROUND

Technical Field

The present disclosure relates to a catalytic converter, and more particularly, to a catalytic converter capable of significantly reducing emission by reducing an activation time of a catalytic device and improving emissions reduction performance, and an exhaust emission emissions reduction control method using the same.

Description of the Related Art

The regulations on discharge of total hydrocarbons ("THC"), carbon monoxide ("CO"), and nitrogen oxide ("NOx") become more stringent as the environmental regulation for vehicle exhaust gas transitions to the Super Ultra Low Emission Vehicle ("SULEV") standard from Ultra Low Emission Vehicle II ("ULEV II"). For example, in the case of THC, total emissions must be reduced from 0.055 g/mile to 0.01 g/mile in the Federal Test Procedure 75 ("FTP-75") mode operation.

A variety of technologies have been implemented in an attempt to meet the more stringent standards, including various types of catalytic converters used to purify the exhaust gas provided in a given position of an exhaust pipe.

A conventional catalytic converter may include a housing and a catalyst substrate mounted inside the housing. The surface of catalyst substrate may be coated with a noble metal and a washcoat.

The catalytic converter requires an activation temperature of approximatively 350° C. or more to start processing and emissions reduction of exhaust gas. When a vehicle engine is started at room temperature or below, harmful substances, such as THC, CO, NOx and the like, are discharged before the catalyst reaches the light-off temperature ("LOT") because the exhaust gas cannot processed and purified by the catalyst.

In order to solve this problem, the amount of energy discharged from an engine and the layout of exhaust system should be optimized to minimize the time needed for a catalyst to reach the light-off temperature. Existing approaches, however, lead to problematic layouts and increased catalyst cost.

Generally, when a gasoline engine is operated in a high speed and a high load area, there is a risk that the temperature of exhaust gas becomes high and the hot exhaust gas flows into the catalyst, thereby damaging the catalyst. However, in order to reduce the time needed to reach the catalyst light-off temperature after the start of the engine, the catalyst should be mounted as close to the engine as possible.

Therefore, in order to solve the above-mentioned problems, when the engine is operated in a high speed and a high load condition, the air-fuel ratio is enriched such that the amount of fuel flowing into the engine is increased, thereby increasing the heat capacity of a low temperature mixer to reduce the temperature inside a cylinder during combustion.

By controlling the richness of the air-fuel ratio in a high-speed and high-load condition, exhaust gas rich in hydrocarbons is introduced into the catalyst, which degrades the emissions reduction performance of the catalyst, as compared to the catalyst performance under the theoretical air-fuel ratio condition.

The above-mentioned conventional catalytic converter comprises a warm-up catalytic converter ("WCC") which is used to reduce the catalyst activation time in the early stage of a cold start, and an underbody catalytic converter ("UCC") mounted on the underbody of the vehicle to compensate for the low emission emissions reduction performance of the WCC. This conventional emissions reduction system is inferior in terms of cost and weight because it requires both the WCC and the UCC.

Along with the noise reduction of the above-described exhaust gas, the WCC and the UCC, which are an immobilization efficiency catalytic device for meeting more stringent regulatory standards of automobile exhaust gas, are used together in the exhaust system. When comparing with systems where the catalytic device requires only a single integrated catalytic converter, in a system having the WCC and the UCC, it is necessary to improve a back pressure generated by the warm-up catalytic converter (WCC) and the underbody catalytic converter (UCC).

In particular, in the case of the turbocharged gasoline direct injection engine ("T-GDI engine"), a catalyst activation time becomes longer than that of a general GDI/multi-point injector ("MPI") engine due to heat loss in turbo mode. As a result, the emissions reduction performance of the catalytic converter is reduced, resulting in excessive emissions discharge. In order to increase the efficiency of the emissions reduction performance, noble metal or the like is used as the catalyst, which increases the cost. In particular, for example, the T-GDI catalyst device requires an excessively long time to reach the catalyst light-off temperature, and noble metal that is coated on the substrate of the catalyst is rapidly consumed due to the temperature decline of the catalyst.

SUMMARY OF THE DISCLOSURE

The present disclosure has been made in view of the above problems, and provides an improved catalytic converter with improved emissions reduction performance capable of reducing the time needed to reach a catalyst light-off temperature, as well as reducing content of entire noble metal needed for the catalyst, and an exhaust gas emissions reduction control method using the same.

In accordance with an example embodiment of the present disclosure, an improved catalytic converter comprises: a housing and two or more catalyst substrates disposed inside the housing, wherein the two or more catalyst substrates are separated inside the housing along a longitudinal direction, and the two or more catalyst substrates have a different diameter and a different volume. The two or more catalyst substrates comprise a first catalyst substrate adjacent to an inlet side of the housing and a second catalyst substrate adjacent to an outlet of the housing. A radius of the first catalyst substrate is smaller than a radius of the second catalyst substrate; similarly, the volume of the first catalyst substrate is smaller than the volume of the second catalyst substrate. The first catalyst substrate and the second catalyst substrate are separated from each other inside the housing and a mixing region is formed between the first catalyst substrate and the second catalyst substrate. An oxygen sensor is installed in the mixing region. At least one of the two or more catalyst substrates has two or more zones which are coated with a different amount of catalyst per zone. The first catalyst substrate comprises a first zone located on a first side of the first catalyst substrate and a second zone located on a second side of the first catalyst substrate. The first zone and the second zone are individually coated with catalysts having a different noble metal content. The first zone has a higher noble metal content than the second zone, and the second zone has a higher noble metal content than the second catalyst substrate.

An example exhaust gas emissions reduction control method using the improved catalytic converter includes: determining whether an air-fuel ratio is lean by measuring oxygen concentration of an engine exhaust gas when the exhaust gas passes through the catalytic converter as combustion of the engine continues; performing lambda control if it is determined that the air-fuel ratio is lean; and determining whether the air-fuel ratio is rich by measuring the oxygen concentration of the exhaust gas after the lambda control.

A further example exhaust gas emissions reduction control method using the improved catalytic converter includes: determining whether an air-fuel ratio is lean by measuring oxygen concentration of engine exhaust gas passing through the catalytic converter after fuel cut; terminating the fuel cut and performing oxygen purge if it is determined that the air-fuel ratio is; and determining whether the air-fuel ratio is rich by measuring the oxygen concentration of the exhaust gas after the oxygen purge.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXAMPLE EMBODIMENTS

Example embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Referring to FIGS. 1 to 4, a catalytic converter 10 according to an embodiment of the present disclosure may include a housing 15 and two or more catalyst substrates 40 and 45 provided inside housing 15.

Figure 1:
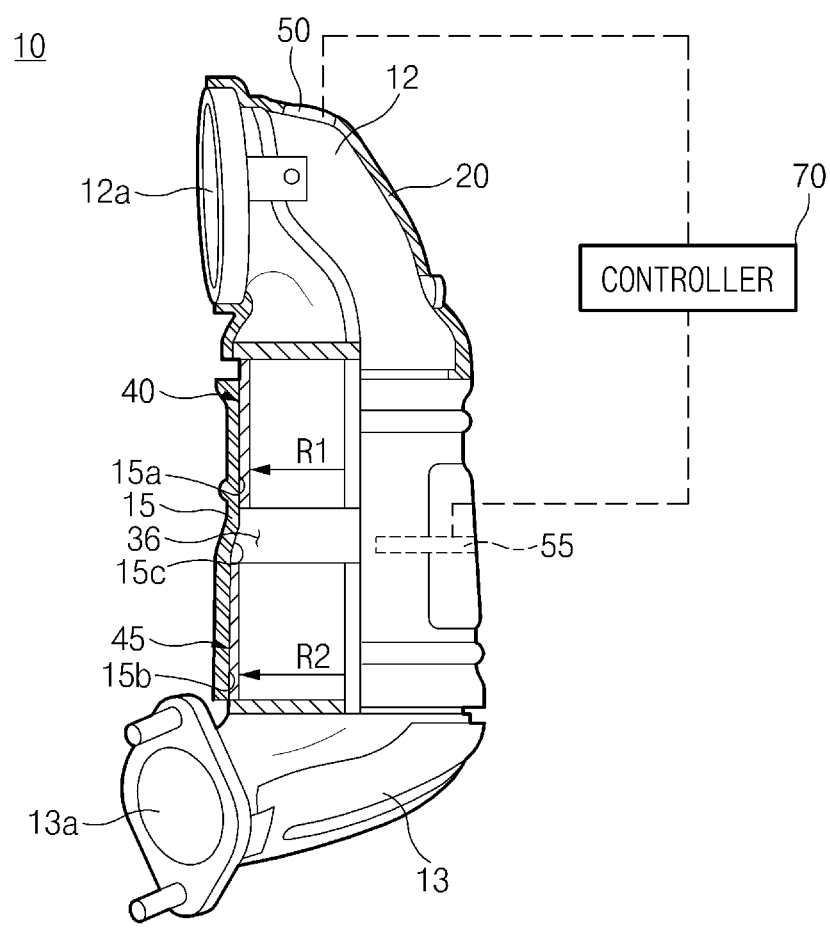
FIG. 1 is a partial cross-sectional view illustrating an improved catalytic converter according to an embodiment of the present disclosure.

FIG. 1 is a cross-sectional view illustrating a part of the catalyst substrates 40 and provided in the housing 15. As shown in FIG. 1, housing 15 may include accommodating sections 15a and 15b, each capable of individually accommodating a catalyst substrate. Each of accommodating sections 15a and 15b may be formed to fit a corresponding outer diameter of catalyst substrates 40 and 45.

An inlet cap 12 may be provided in one end of housing 15, and inlet cap 12 may include an inlet hole 12a through which exhaust gas flows enters catalytic converter 10. An outlet cap 13 may be provided in the other end of housing 15, and outlet cap may include an outlet hole 13a through which the exhaust gas is discharged from catalytic converter 10.

One or more covers 20 may be provided on the outer surface of inlet cap 12. The covers 20 act to insulate the interior of inlet cap 12, thereby increasing the interior temperature of inlet cap 12.

Because cover 20 is provided on the outer surface of inlet cap 12 as described above, thermal energy of the exhaust gas flowing into catalytic converter 10 at startup may be prevented from being lost to the outside, thereby reducing the time needed to reach LOT and significantly improving the emissions reduction performance.

The two or more catalyst substrates 40 and 45 are separated inside housing 15 along a longitudinal direction to form a cascaded catalytic converter.

The two or more catalyst substrates 40 and 45 may have a different volume, and thus, the catalyst substrates 40 and 45 may perform different functions and may cooperate with each other to more efficiently reduce emissions. Accordingly, it is possible to reduce the time needed to reach LOT and significantly improve the emissions reduction performance.

According to an embodiment of the present disclosure, catalyst substrates 40 and 45 may include a first catalyst substrate 40 adjacent to an inlet of housing 15, i.e., inlet cap 12; and a second catalyst substrate 45 adjacent to an outlet of housing 15, i.e., outlet cap 13.

First catalyst substrate 40 and Second catalyst substrate 45 may have a different radius R1 and R2, respectively. Accordingly, first catalyst substrate 40 and second catalyst substrate 45 may also have a different volume.

According to one embodiment, radius R1 of first catalyst substrate 40 is smaller than radius R2 of second catalyst substrate 45, so that volume of first catalyst substrate 40 is smaller than the volume of second catalyst substrate 45. First catalyst substrate 40 and second catalyst substrate 45 may have the same length or a different length.

According to an embodiment of the present disclosure, it is possible to facilitate a rapid feedback control loop through the rapid detection of the oxygen concentration and the reduction of the catalyst activation time. Because the volume of the first catalyst substrate 40 is relatively small, it requires less time to reach LOT, but has less ability to process the volume of emissions in the exhaust gas. Therefore to improve overall emissions reduction, first catalyst substrate 40 may be supplemented by the emissions reduction performance of second catalyst substrate 45, which has a relatively large volume.

In addition, housing 15 may include a first accommodating section 15a for accommodating first catalyst substrate 40 and a second accommodating section 15b for accommodating second catalyst substrate 45. The inner diameter of first accommodating section 15a corresponds to the outer diameter of first catalyst substrate 40 and the inner diameter of second accommodating section 15b corresponds to the outer diameter of second catalyst substrate 45.

When radius R1 of first catalyst substrate 40 is smaller than the radius R2 of the second catalyst substrate 45, the inner diameter of first accommodating section 15a may be smaller than the inner diameter of second accommodating section 15b. Thus, an inclined plane 15c may be formed between first accommodating section 15a and second accommodating section 15b, and the radius of inclined plane 15c increases from first accommodating section 15a towards second accommodating section 15b side.

The outer surface of first catalyst substrate 40 may be wrapped by a support mat and may be accommodated in first accommodating section 15a of housing 15, and the outer surface of the second catalyst substrate 45 may be wrapped by the support mat and may be accommodated in second accommodating section 15b of housing 15.

In an example embodiment, first catalyst substrate 40 may have a diameter of Φ105.7*(80~84) mm, and its volume may be approximately 0.7 to 0.74 L. Because first catalyst substrate 40 has a compact structure with a relatively small diameter and volume, the distance to the outlet of the exhaust system of the engine may be reduced, and the heat capacity of the catalyst may be reduced. It is possible not only to significantly reduce the time needed to reach LOT but also to significantly improve the emission emissions reduction performance.

In an example embodiment, second catalyst substrate 45 may have a diameter of approximately Φ118.4*(80) mm, and a volume of approximately 0.9 L. Because the diameter and the length of second catalyst substrate 45 are larger than those of first catalyst substrate 40, a relatively large volume may be achieved. Thus, the catalyst emissions reduction performance of the first catalyst substrate 40, which has a relatively small volume, may be compensated for by the larger volume of second catalyst substrate. In addition, as second catalyst substrate 45 has a relatively large volume, the heat capacity may be increased. Accordingly, it is possible to reduce the time needed to reach LOT of the HOT START section of the Federal Test Procedure (FTP), thereby improving the emission reduction performance.

As described above, according to the present disclosure, the time needed for the first catalyst substrate to reach LOT may be reduced by the smaller diameter and smaller volume of the first catalyst substrate 40. Overall emission reduction performance may be improved by supplementing first catalyst substrate with 40 with second catalyst substrate 45, which has a relatively large volume. Accordingly, it is possible to overcome various drawbacks of the related art at the same time.

According to an embodiment of the present disclosure, the volume ratio of first catalyst substrate 40 to second catalyst substrate 45 may be between about 40-60% to about 50-50%. Preferably, the volume ratio of the first catalyst substrate 40 to second catalyst substrate 45 is 45%:55%.

Figure 7:
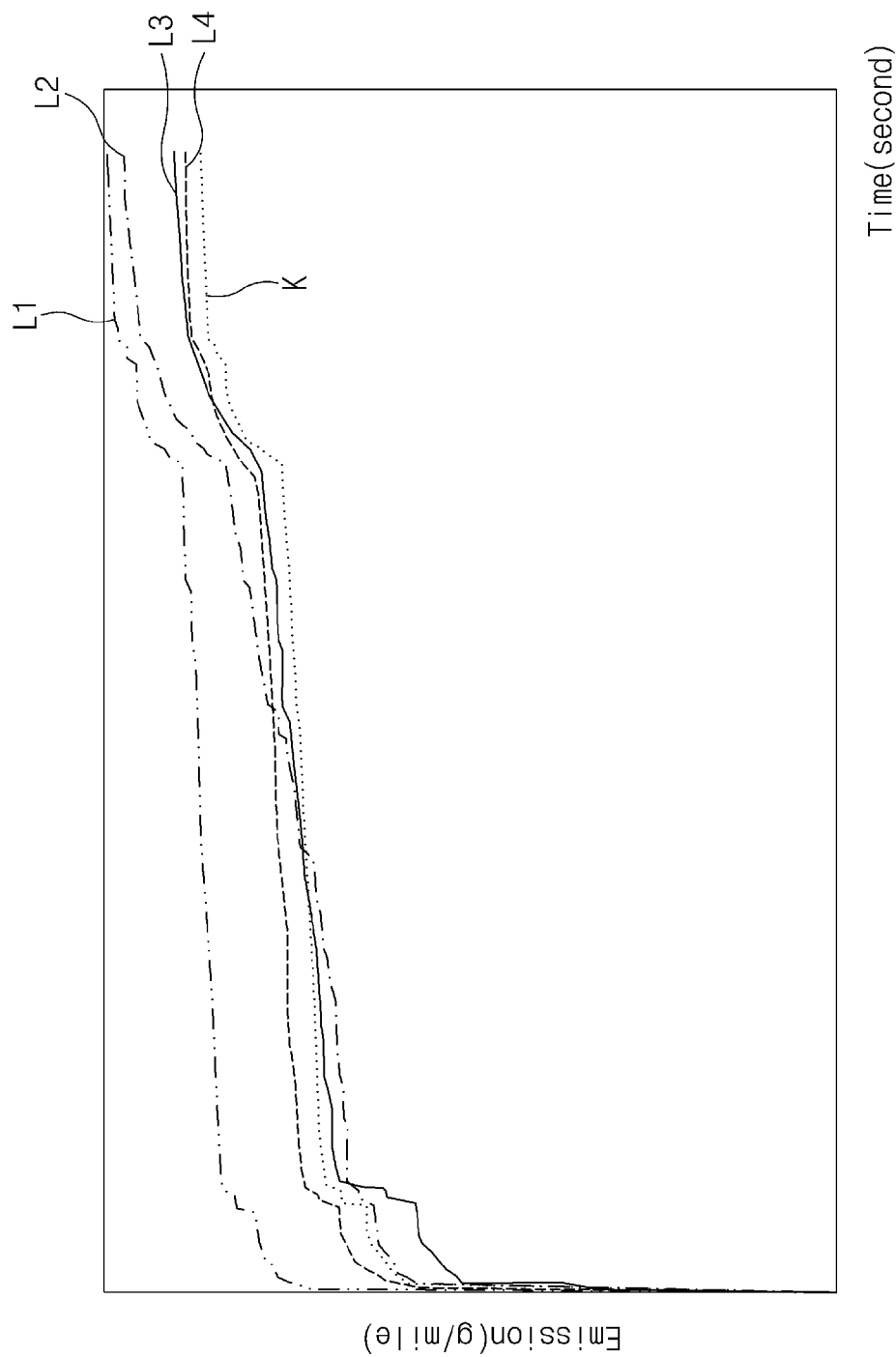
FIG. 7 is a graph comparing total emissions over time for a variety of conventional catalytic converters as compared to an example embodiment of the present disclosure.

FIG. 7 is a graph illustrating the total emissions generated over time by a conventional catalytic converter as compared to example embodiments of the improved catalytic converter.

In FIG. 7, Line K indicates total emissions generated over time in an example embodiment of the improved catalytic converter according to the present disclosure; Line L1 indicates total emissions generated over time in conventional catalytic converter according to the related art 1; Line L2 indicates total emissions generated over time in the conventional catalytic converter according to the related art 2; Line L3 indicates total emissions generated over time in the conventional catalytic converter according to the related art 3; and Line L4 indicates total emissions generated over time in the conventional catalytic converter according to the related art 4.

As can be seen from FIG. 7, in the beginning total emissions generated in the improved catalytic converter (line K) are lower than in conventional catalytic converters as described in related art 1(L1) and the related art 4(L4). As time increases, total emissions generated in the improved catalytic converter are significantly less than in all four of the conventional catalytic converters (represented by lines L1-L4).

First catalyst substrate 40 and second catalyst substrate 45 may be separated from each other in housing 15, creating a mixing region 36 them. Exhaust gas passed through the first catalyst substrate may be diffused by mixing region 36 so that the exhaust gas uniformly flows toward second catalyst substrate 45.

An inclined plane 15c may be formed between first accommodating section 15a and second accommodating section 15b of housing 15, and the inclined plane 15c may be formed to be inclined in response to a difference between the inner diameter of the first accommodating section 15a and the inner diameter of the second accommodating section 15b. Accordingly, the mixing region 36 may be defined by the inclined plane 15c, the rear end of first catalyst substrate 40, and the front end of the second catalyst substrate 45. As described above, mixing region 36 is configured so that one end corresponds to the radius R1 of first catalyst substrate 40 and the other end corresponds to the radius R2 of second catalyst substrate 45, and inclined plane 15c of housing 15 extends from the first accommodating section to the second accommodating section, providing stable flow of the exhaust gas between the two catalyst sections. In an example embodiment, mixing region 36 may have a length of about 20 to 30 mm.

A first oxygen sensor 50 may be installed in inlet cap 12 and a second oxygen sensor 55 may be installed in mixing region 36. The first oxygen sensor 50 and the second oxygen sensor 55 may be connected to a controller 70 such as an engine management system ("EMS").

The amount of oxygen in the exhaust gas may be measured by first oxygen sensor 50 and second oxygen sensor 55, and the rich/lean state of the air-fuel mixture may be transmitted to controller 70 (e.g. by the output voltage of the first and second oxygen sensors 50 and 55).

According to an embodiment of the present disclosure, because second oxygen sensor 55 is disposed in the mixing region 36, i.e., between the first catalyst substrate 40 and the second catalyst substrate 45, the feedback lambda control may be performed quickly according to the air-fuel mixture condition of first catalyst substrate 40. Accordingly, the emissions reduction performance may be significantly improved.

Because first catalyst substrate 40 is smaller in volume than second catalyst substrate 45, the second oxygen sensor 55 may more quickly detect the oxygen storage capacity ("OSC"). Particularly, because the oxygen concentration for first catalyst substrate 40 is quickly detected after the fuel cut and the second catalyst substrate 45 maintains a relatively high temperature, the NOx reduction performance may be improved when the O2 purge control is applied. As described above, as the NOx reduction performance is improved, the fuel cut control may be increased, thereby improving the fuel efficiency.

According to an embodiment of the present disclosure, at least one of the two or more catalyst substrates may have two or more zones coated with different amounts of catalyst by zone.

Figure 2:
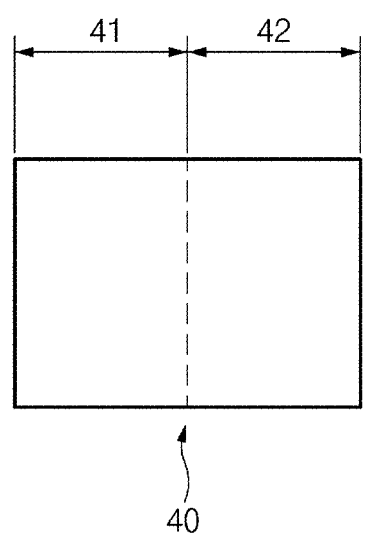
FIG. 2 is a side view illustrating a first catalyst substrate of an improved catalytic converter according to an embodiment of the present disclosure.

Referring to FIG. 2, first catalyst substrate 40 may have two or more zones 41 and 42. Zones 41 and 42 may have coatings a different noble metal content. In addition, zones 41 and 42 may be partitioned from each other.

According to one embodiment, first catalyst substrate 40 may include first zone 41 located in a first side of first catalyst substrate 40 and second zone 41 located in a second side of first catalyst substrate 40. First zone 41 may be disposed adjacent to inlet cap 12 of catalytic converter 10 and second zone 42 may be disposed adjacent to second catalyst substrate 45.

First zone 41 may be coated with a catalyst having a high noble metal content in comparison with second zone 42. In addition, the noble metal content in second zone 42 of first catalyst substrate 40 may be higher than that in second catalyst substrate 45. That is, the noble metal content may be highest in first zone 41 of first catalyst substrate 40, lowest in second catalyst substrate 45, and in the middle in second zone 42 of first catalyst substrate 40.

According to an embodiment of the present disclosure, the ratio of the noble metal content of first catalyst substrate 40 to the noble metal content of second catalyst substrate 45 may be from about 75 wt %:25 wt % to about 85 wt %:15 wt %. Preferably, the noble metal content ratio of first catalyst substrate to second catalyst substrate 45 is about 80 wt %:20 wt %.

According to another embodiment of the present disclosure, the ratio of the noble metal content in each of the three catalyst regions (i.e. first zone 41 of first catalyst substrate 40, second zone 42 of first catalyst substrate 40, and second catalyst substrate 45) is about 45 wt %:25 wt %:20 wt %. and thus, it is possible to satisfy regulations such as ULEV 70 which is highly regulated.

According to another embodiment of the present disclosure, the noble metal content ratio of the three zones is about 55 to 65 wt %:15 to 25 wt %:20 wt %, and thus, it is possible to satisfy regulations such as ULEV 70 which is highly regulated.

According to another embodiment of the present disclosure, the noble metal content ratio of the three zones is about 60 wt %:20 wt %:20 wt %.

As described above, when the content of the noble metal in first zone 41 of first catalyst substrate 40 is high, the deviation of total emissions is small, and thus the emission discharge amount may be lower than a target value.

As described above, according to the present disclosure, as the noble metal content of first zone 41, second zone 42, and second catalyst substrate 45 is different, the noble metal content required for the catalytic converter may be reduced in comparison with that of the conventional catalytic converter. Accordingly, the manufacturing cost may be significantly reduced.

Figure 6:
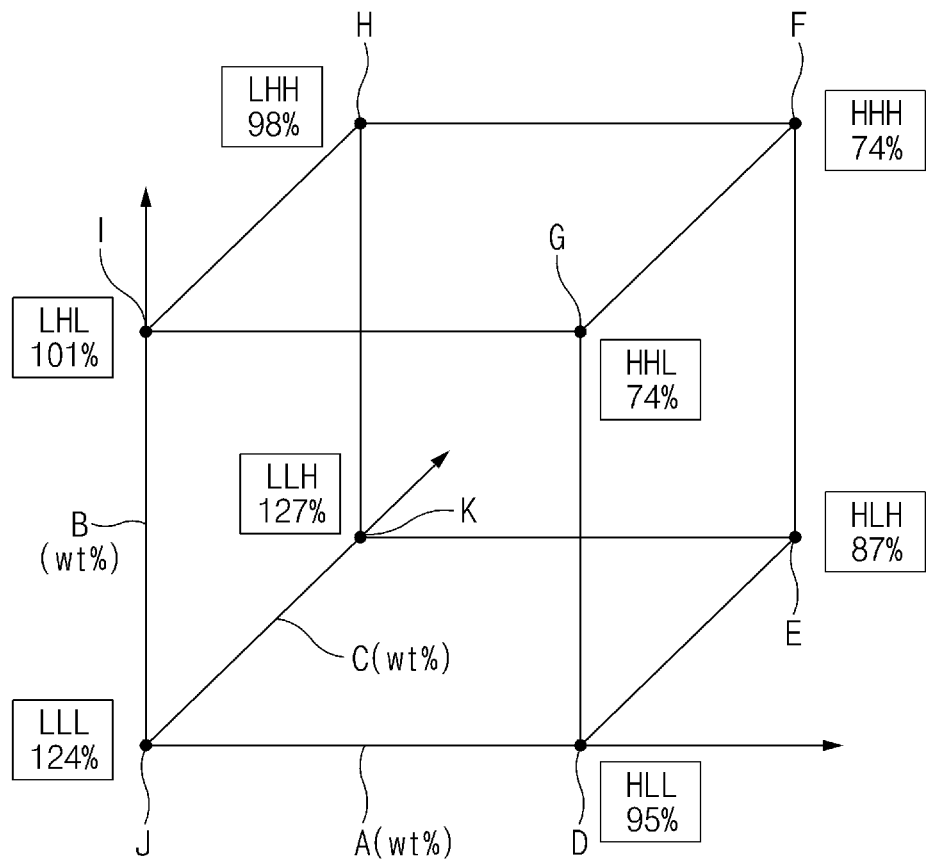
FIG. 6 is a graph illustrating total emissions as a function of the content of noble metal in a first zone of a first catalyst substrate, a second zone of a first catalyst substrate, and a second catalyst substrate of the present disclosure, as compared to a design target emissions value.

FIG. 6 is a graph illustrating the exhaust quantity of emission as a function of the noble metal content (A, wt %) in first zone 41 of first catalyst substrate 40, the noble metal content (B, wt %) of second zone 42 of first catalyst substrate 40, and the noble metal content (C, wt %) of second catalyst substrate 45, compared to a design target value for emissions.

Axis A indicates the noble metal content (wt %) of first zone 41 of first catalyst substrate 40. The noble metal content of first zone 41 increases towards a point D from a point J on the A axis.

Axis B indicates the noble metal content (wt %) of second zone 42 of first catalyst substrate 40. The noble metal content of second zone 42 increases towards a point I from a point J on the B axis.

The C axis indicates the noble metal content (wt %) of second catalyst substrate 45. The noble metal content of the second catalyst substrate 45 increases towards a point K from the point J on the C axis.

Point J is a point where the noble metal content (wt %) of first zone 41 of first catalyst substrate 40, the noble metal content (wt %) of second zone 42 of first catalyst substrate 40, and the noble metal content (wt %) of second catalyst substrate 45 are all the lower limit values. At point J (LLL), the emission discharge amount of emission is 124% of the target value.

Point D is a point where the noble metal content (wt %) of first zone 41 of first catalyst substrate 40 is the upper limit value, and the noble metal content (wt %) of second zone 42 of first catalyst substrate 40 and the noble metal content (wt %) of second catalyst substrate 45 are all the lower limit values. At point D (HLL), the emissions discharge amount is 95% of the target value.

Point E is a point where the noble metal content (wt %) of first zone 41 of first catalyst substrate 40 is the upper limit value, the noble metal content (wt %) of second zone 42 of first catalyst substrate 40 is the lower limit value, and the noble metal content (wt %) of the second catalyst substrate 45 is the upper limit value. At point E (HLH), the emissions discharge amount is 87% of the target value.

Point F is a point where the noble metal content (wt %) of first zone 41 of first catalyst substrate 40, the noble metal content (wt %) of second zone 42 of first catalyst substrate 40, and the noble metal content (wt %) of second catalyst substrate 45 are all the upper limit values. At point F (HHH), the emissions discharge amount is 74% of the target value.

Point G is a point where the noble metal content (wt %) of first zone 41 of first catalyst substrate 40 and the noble metal content (wt %) of second zone 42 of first catalyst substrate 40 are the upper limit values, and the noble metal content (wt %) of second catalyst substrate 45 is the lower limit value. At point G (HHL), the emissions discharge amount is 74% of the target value.

Point H is a point where the noble metal content (wt %) of first zone 41 of first catalyst substrate 40 is the lower limit value, and the noble metal content (wt %) of second zone 42 of first catalyst substrate 40 and the noble metal content (wt %) of second catalyst substrate 45 are the upper limit values. At point H (LHH), the emissions discharge amount is 98% of the target value.

Point I is a point where the noble metal content (wt %) of first zone 41 of first catalyst substrate 40 is the lower limit value, the noble metal content (wt %) of second zone 42 of first catalyst substrate 40 is the upper limit value, and the noble metal content (wt %) of second catalyst substrate 45 is the lower limit value. At the point I (LHL), the emissions discharge amount is 101% of the target value.

FIG. 6 shows emissions amounts at 74%, 87%, 95%, etc. of the target value when the noble metal content (wt %) of first zone 41 of first catalyst substrate 40 is the upper limit value, thus emissions may be reduced when the noble metal content of first zone 41 of first catalyst substrate 40 is high.

The catalyst may further comprise a washcoat, a noble metal, etc. According to an embodiment of the present disclosure, the noble metal of the catalyst may be selected from platinum-group metals such as palladium (Pd), platinum (Pt), rhodium (Rh), ruthenium (Ru), iridium (Ir), osmium (Os), and the like.

Figure 5:
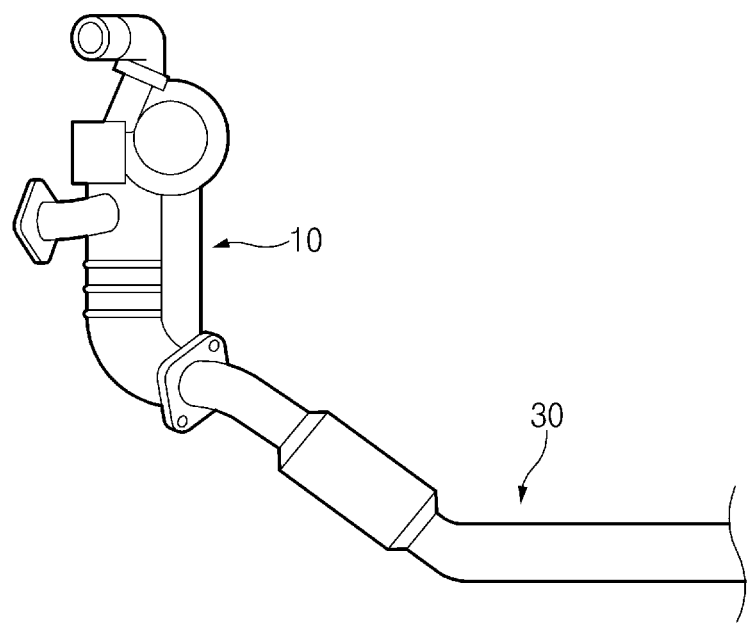
FIG. 5 is a view illustrating an improved catalytic converter according to an embodiment of the present disclosure provided in an exhaust pipe.

As shown in FIG. 5, catalytic converter 10 according to an embodiment of the present disclosure may be installed in exhaust pipe 30 of the exhaust system, and in particular, similarly to a conventional warm-up catalytic converter, may be installed close to the engine (not shown) or may be attached to the side surface of the engine.

As described above, it is possible to achieve the desired benefits of improved emissions reduction performance and correspondingly reduced emissions, compact form, and the like, by using a structure that has two or more catalyst substrates 40 and 45 having different volumes where catalytic converter 10 is installed close to the engine.

Figure 3:
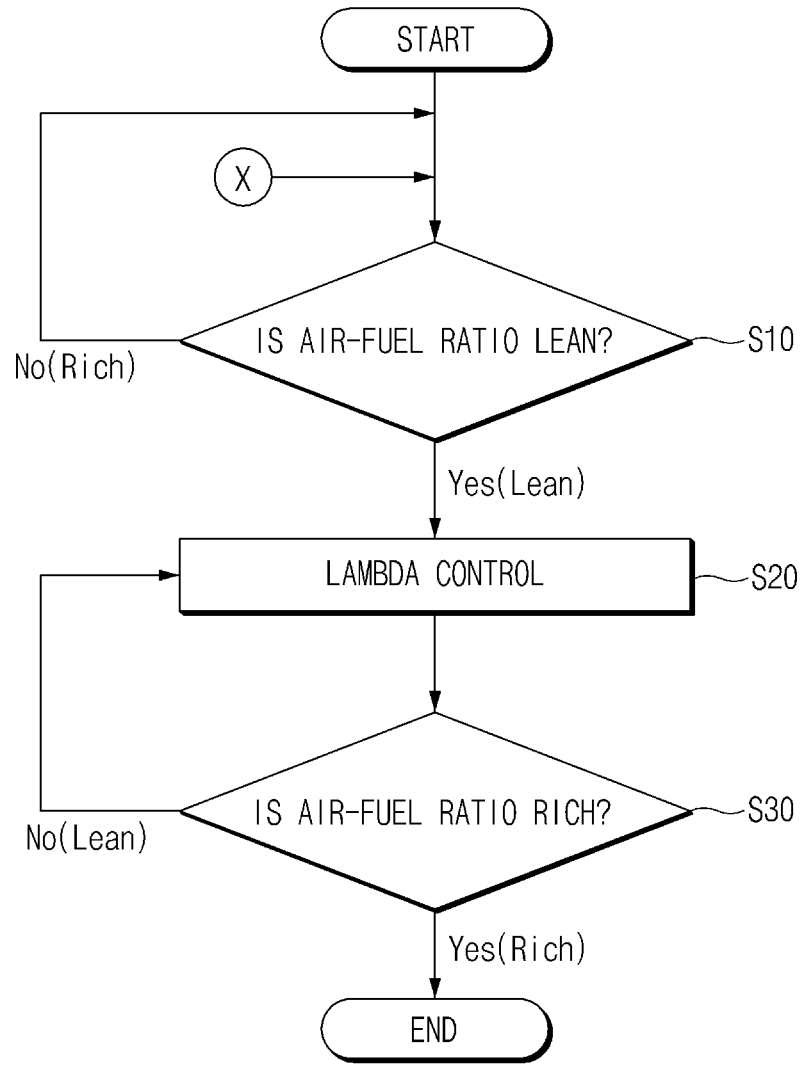
FIG. 3 is a flowchart illustrating an exhaust gas emissions reduction control method using an improved catalytic converter according to an embodiment of the present disclosure in a normal combustion section of an engine.

FIG. 3 is a flowchart illustrating an exhaust gas emissions reduction control method using an improved catalytic converter according to an embodiment of the present disclosure in a combustion section of an engine.

Referring to FIG. 3, the engine exhaust gas may pass through catalytic converter 10 if the combustion of the engine continues after the start of the engine.

Oxygen concentration of the exhaust gas passing through catalytic converter 10 may be measured by the first and second oxygen sensors 50 and 55. Based on the measured oxygen concentration, controller may determine whether the air-fuel ratio is lean (S10). As used herein, a lean air-fuel ratio means a fuel-air mixture state in which the air-fuel equivalence ratio, lambda ($\lambda$), is greater than 1 ($\lambda$>1).

If the air-fuel ratio is lean at step S10, the controller 70 may perform a lambda control (S20) to adjust the air-fuel mixture ratio.

When the state where the air-fuel ratio is lean, as the second catalyst substrate 45 may have a larger volume than the first catalyst substrate 40, it may have a high heat capacity, thereby improving the reduction performance of NOx, etc.

After the lambda control, controller 70 may determine whether the resulting air-fuel ratio is rich (S30). If it is determined, at step S30, that the air-fuel ratio is rich, the logic of FIG. 3 is terminated. Here, the richness of the air-fuel ratio means a fuel-air mixture state in which lambda ($\lambda$) is smaller than 1 ($\lambda$<1). If the air-fuel ratio is not rich, then lambda control is repeated.

The air-fuel ratio control logic of FIG. 3 may be repeatedly performed while the combustion of the engine is continued.

As described above, in the state in which the air-fuel ratio is rich, the rich hydrocarbon (HC) cannot be fully purified when passing through the smaller first catalyst substrate 40 directly. However, when the air-fuel ratio is changed from the lean condition to the rich condition, as the larger second catalyst substrate 45 maintains the lean condition for a certain period of time, the rich hydrocarbon may be effectively reduced by the second catalyst substrate 45. Further, the reduction of the rich hydrocarbon may be more effectively achieved by the high temperature and large volume of the second catalyst substrate 45.

Figure 4:
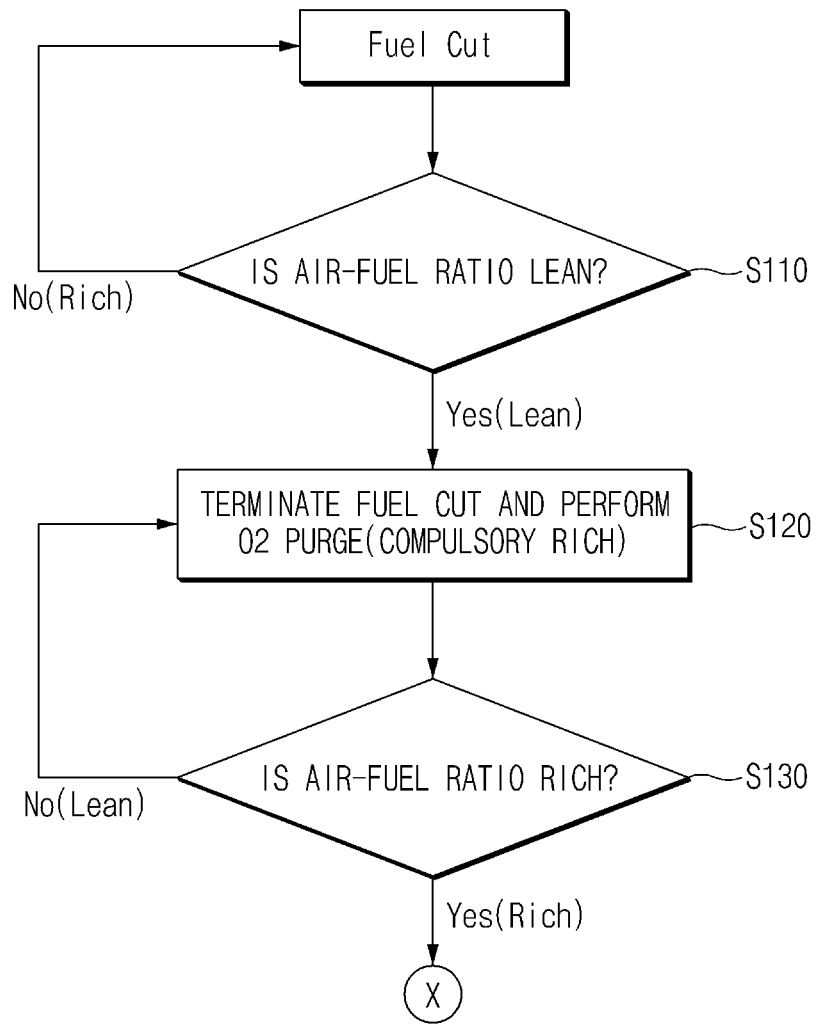
FIG. 4 is a flowchart illustrating an exhaust gas emissions reduction control method using an improved catalytic converter according to an embodiment of the present disclosure in a fuel cut state.

FIG. 4 is a flowchart illustrating an exhaust gas emissions reduction control method using an improved catalytic converter according to an embodiment of the present disclosure in a fuel cut state.

Referring to FIG. 4, after the fuel cut, the oxygen concentration of the exhaust gas passing through catalytic converter 10 may be measured by first and second oxygen sensors 50 and 55. Based on the measured oxygen concentration, controller 70 determines whether the air-fuel ratio is lean (S110).

If it is determined, at step S110, that the air-fuel ratio is lean, the air-fuel ratio is adjusted to a rich composition by performing an oxygen purge while terminating the fuel cut (i.e., supplying fuel) (S120).

When the air-fuel ratio is lean, because the second catalyst substrate 45 has a larger volume than the first catalyst substrate 40, it has a higher heat capacity, thereby improving the reduction performance of NOx, etc.

After the termination of the fuel cut and the O2 purge (S120), controller 70 again determines whether the air-fuel ratio is rich (S130).

If it is determined, at step S130, that the air-fuel ratio is rich, the process proceeds to step S10 of FIG. 3 (X), and thus, the controller 70 may perform the air-fuel ratio control in the combustion section of the engine in accordance with FIG. 3.

When the air-fuel ratio is rich, the rich hydrocarbon (HC) cannot be fully purified when passing through the smaller first catalyst substrate 40 directly. However, when the air-fuel ratio is changed from the lean condition to the rich condition, because the larger second catalyst substrate 45 maintains the lean condition for a certain period of time, the rich hydrocarbon may be effectively reduced by the second catalyst substrate 45. Further, the reduction of the rich hydrocarbon may be more effectively achieved by the high temperature and large volume of the second catalyst substrate 45.

If it is determined, at step S130, that the air-fuel ratio is lean, the termination of the fuel cut and the performing of O2 purge (S120) is repeated.

By applying the exhaust gas emissions reduction control method using the improved catalytic converter 10 according to the present disclosure as described above, it is possible to significantly reduce the time needed to reach catalyst LOT and improve the emissions reduction performance in the T-GDI engine. It is also possible not only to reduce the amount of noble metal needed in the catalyst, but also to significantly reduce total emissions.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An improved catalytic converter comprising:
   a housing; and
   two catalyst substrates disposed inside the housing;
   wherein the catalyst substrates are separated inside the housing,
   wherein the catalyst substrates have a different radius and a different volume,
   wherein the two catalyst substrates comprise a first catalyst substrate adjacent to an inlet side of the housing and a second catalyst substrate adjacent to an outlet side of the housing, wherein one of the two catalyst substrates has two zones having different amounts of catalyst, wherein the first catalyst substrate comprises a first zone located on a first side of the first catalyst substrate and a second zone located on a second side of the first catalyst substrate, wherein the first zone and the second zones are comprised of catalysts having different noble metal contents, and wherein the first zone has a higher noble metal content than the second zone, and the second zone has a higher noble metal content than the second catalyst substrate.

2. The improved catalytic converter of claim 1, wherein the radius of the first catalyst substrate is smaller than the radius of the second catalyst substrate.

3. The improved catalytic converter of claim 1, wherein the volume of the first catalyst substrate is smaller than the volume of the second catalyst substrate.

4. The improved catalytic converter of claim 1, further comprising a mixing region formed between the first catalyst substrate and the second catalyst substrate.

5. The improved catalytic converter of claim 4, further comprising an oxygen sensor is installed in the mixing region.

6. An exhaust gas emissions reduction control method using the improved catalytic converter according to claim 1, the method comprising the steps of:
   determining whether an air-fuel ratio is lean by measuring oxygen concentration of engine exhaust gas passing through the catalytic converter during combustion of the engine;
   if the air-fuel ratio is lean, performing lambda control of the air-fuel mixture; and
   following lambda control, determining whether the air-fuel ratio is rich by measuring the oxygen concentration of the engine exhaust gas.

7. An exhaust gas emissions reduction control method using the improved catalytic converter according to claim 1, the method comprising:
   determining whether an air-fuel ratio is lean by measuring oxygen concentration of engine exhaust gas passing through the catalytic converter after a fuel cut;
   if the air-fuel ratio is lean, supplying fuel to the engine and purging oxygen; and
   after purging oxygen, determining whether the air-fuel ratio is rich by measuring the oxygen concentration of the engine exhaust gas.

* * * * *